3,801,695
PROCESS FOR THE SEPARATION OF NICKEL AND/OR COBALT FROM MANGANESE
Wilhelm Roever, Helmut Junghanb, and Alfred Roeder, Duisburg, Hans-Werner Kauczor, Leverkusen, and Gunter Kuhne, Cologne, Germany, assignors to Bayer Aktiengesellschaft, and Duisburger Kupferhutte, both of Leverkusen, Germany
No Drawing. Filed Oct. 17, 1972, Ser. No. 298,360
Claims priority, application Germany, Oct. 19, 1971, P 21 51 893.4
Int. Cl. C01g 45/00, 51/00, 53/00
U.S. Cl. 423—49                                     5 Claims

ABSTRACT OF THE DISCLOSURE

Passing an aqueous solution of salts of the title metals at a pH of 1.5 to 3.5 and at a temperature of 30 to 80° C. through at least two serially connected resin columns containing a complex-forming ion exchange resin having aminocarboxylic acid and/or iminodicarboxylic acid groups as the active exchange groups until nickel and/or cobalt ions appear in the effluent of the last resin column and then disconnecting and eluting nickel and/or cobalt from the first resin column.

---

The present invention relates to a process for the quantitative separation of nickel and/or cobalt from manganese by means of ion exchange.

It is known to separate nickel from manganese in that the manganese is separated by oxidizing precipitation from the aqueous solution of these metals. It is furthermore known to separate cobalt from manganese by preferred slagging of the manganese from the melt of these metals.

It has now been found that nickel and/or cobalt can be separated quantitatively by ion exchange from manganese by passing an aqueous solution having a pH of 1.5 to 3.5 and a temperature of from 30 to 80° C. and containing a salt of manganese and at least one salt selected from the group consisting of cobalt salts and nickel salts, the anion of each of said salts being selected from the group consisting of chloride, sulfate, nitrate, phosphate and acetate, through at least two serially connected resin columns containing a complex-forming ion exchange resin having aminocarboxylic acid and/or iminodicarboxylic acid groups as the active exchange groups until nickel and/or cobalt ions appear in the effluent of the last resin column and then disconnecting and eluting nickel and/or cobalt from the first resin column. It is preferred to carry out the process at a temperature in between the range of 30–80° C. and at a pH value in between the range of 2.0–2.5.

The process according to the invention can be carried out in the presence of, for example, chloride, sulphate, nitrate and acetate ions. The presence of strongly oxidizing anions, such as for example perchlorate ions, should be avoided.

The concentration of cobalt and/or nickel and manganese in the initial solution can vary within a wide range and has no influence on the process according to the invention. Thus, the quantitative separation of the cobalt and/or nickel from manganese can also be performed when the concentrations of cobalt and/or nickel are extremely low compared with the concentration of the manganese in the initial solution. The number of columns to be connected in series should be the larger, the lower the concentration of cobalt and/or nickel in relation to the concentration of manganese in the initial solution.

If, for example, three series-connected columns are chosen, the first column for washing and elution of the loaded ion exchanger is disconnected as soon as cobalt and/or nickel ions appear in the last column. The solution to be processed is further conducted over what were previously the second and third columns and over an additional (fourth) resin column until nickel and/or cobalt ions appear in the last column. If work is continued in this way in that an additional column is always connected, then a manganese solution is obtained which is free of cobalt and/or nickel ions, whereas the resin columns are loaded with nickel and/or cobalt ions. The column through which the solution for processing first flows is eluted after washing with dilute aqueous nonoxidizing mineral acids, such as, for example, salt or sulphuric acid. Hence, solutions of nickel and/or cobalt are obtained which are almost free of manganese. After elution the ion exchanger is in the hydrogen form. The ion exchanger is employed in the hydrogen form or in the salt form, for example the $NH_4$, alkali metal, alkaline earth metal or manganese form.

The conversion to these salt forms is carried out, for example, by treatment with the aqueous solutions of alkali metal or alkaline earth metal hydroxides or with ammonia solution. The conversion to the manganese form can be carried out by treatment of the hydrogen form of the ion exchanger with a manganese salt solution and an alkali metal hyroxide solution. The complex forming ion exchangers used in the process of the invention are known per se and can be obtained, for example, according to the method disclosed in the British Pat. 767,821. They consist of a matrix, which was produced by copolymerization of monovinyl aromatic and polyvinyl compounds, and of complex forming aminocarboxylic acid and iminodicarboxylic acid groups. Possible vinyl aromatic compounds are for example, compounds such as styrene, methylstyrene, vinyl anisole and vinyl naphthalene. As polyvinyl compounds there may be mentioned divinyl benzene, trivinyl benzene, ethylene glycol, dimethacrylate and divinyl ketone. Preferable complex forming ion exchangers for use in the process in accordance with the invention are those whose matrix consists of macroporous copolymers. The manufacture of such macroporous copolymers is likewise known and can be carried out for example according to the German Pat. 1,045,102. The introduction of the aminocarboxylic acid and iminodicarboxylic acid groups into such macroporous copolymers is likewise carried out according to known methods. Complex forming ion exchangers based on macroporous copolymers have the advantage that they show excellent stability towards frequent changes in volume as occur on changing from an acid to an alkaline medium. In addition they are also stable by working at high temperatures.

EXAMPLE 1

A manganese sulphate solution, which contains 19.1 g./l. manganese, 1.8 g./l. cobalt and 2.0 g./l. nickel, is adjusted to a pH value of 2.5 and passed at a temperature of 50–60° C. over 2 series-connected columns which are each filled with 0.5 l. of a complex forming ion exchanger. The specific flowrate of the resin amounts to 7–8 l. of solution/h. per litre of ion exchanger. A complex forming ion exchanger based on a macroporous styrene-divinyl benzene copolymer in the sodium form was used. The copolymer was obtained in a manner known per se according to the German Pat. 1,045,102. The aminocarboxylic acid and iminodicarboxylic acid groups were likewise introduced in a manner known per se.

After 8 l. of the solution have flown through both columns, cobalt begins to appear in the effluent of the second column. Nickel ions are not detectable in the effluent. After this the first column is disconnected and another 7 l. solution passed over the second and a third column, which is additionally connected, until cobalt is detectable in the effluent of the third column. The resulting manganese solution contains 2–3 mg. cobalt/l. and less than 1 mg. of nickel/l. The first and second resin columns are substantially loaded with nickel and cobalt, whereas the third column largely contains manganese as well as cobalt and a little nickel and can be used furthermore for complete loading with nickel and cobalt.

The first and second columns are washed with weakly acidic water and then eluted with 2 n $H_2SO_4$. When using 1 l. of 10% $H_2SO_4$ per resin column, 2 l. of eluate are obtained. This eluate contains 14.8 g./l. nickel, 9.2 g./l. of cobalt and less than 2.5 g./l. of manganese. The metal loading of the resin of the first and second column amounts to 53 g./l. of exchanger resin.

If the processing of the manganese solution is performed from the start over three series-connected exchanger columns and if the first column for washing and elution is disconnected when cobalt appears in the third column, the eluate of the first and second columns has a manganese content of less than 1 g./l.

After elution the ion exchanger is in the acid form. It is converted into the sodium form by treatment with dilute sodium hydroxide solution.

EXAMPLE 2

A solution, which contains 19.6 g./l. of nickel and 13.6 g./l. of manganese as chlorides, is adjusted to pH value of 2. The solution was the specific flowrate of 6–7 l./h./l. exchanger resin is passed at 60–65° C. over three series-connected ion exchanger columns which are each filled with 1 l. of a complex forming ion exchanger. There was employed a complex forming ion exchanger resin based on a macroporous styrene-divinyl benzene copolymer into which aminocarboxylic acid and iminodicarboxylic acid groups had been introduced in a manner known per se.

After filtration of 8.4 l. solution nickel begins to appear in the effluent of the third column. Thereafter the first column is disconnected and a further 3.2 l. of solution passed over the second and third as well as a fourth column, which is additionally connected. Towards the end of filtration the nickel content rises to 10–12 mg./l. in the effluent of this fourth column. The total of 11.6 l. of solution thus treated contains less than 6 mg./l. nickel.

The columns 1 and 2 are washed with washing water with a pH value of 2. The washing solution contains manganese and nickel and can be recycled. Thereafter elution is carried out with 2 n of hydrochloric acid. On using 2.5 l. of acid per resin column 5 l. of eluate are obtained which contains 24.1 g./l. nickel and 0.4 to 0.55 g./l. of manganese.

The third and in particular the fourth resin column are not yet completely loaded with nickel. They can therefore be used furthermore for complete loading.

We claim:

1. A process for the quantitative separation of nickel and/or cobalt from manganese by ion exchange which comprises passing an aqueous solution having a pH of 1.5 to 3.5 and a temperature of from 30 to 80° C. and containing a salt of manganese and at least one salt selected from the group consisting of cobalt salts and nickel salts, the anion of each of said salts being selected from the group consisting of chloride, sulfate, nitrate, phosphate and acetate, through at least two serially connected resin columns containing a complex-forming ion exchange resin having aminocarboxylic acid and/or iminodicarboxylic acid groups as the active exchange groups until nickel and/or cobalt ions appear in the effluent of the last resin column and then disconnecting and eluting nickel and/or cobalt from the first resin column.

2. The process of claim 1 wherein said pH is from 2.0 to 2.5.

3. The process of claim 1 wherein said temperature is from 50 to 70° C.

4. The process of claim 1 wherein the complex-forming ion exchange resin is based on a copolymer of styrene and divinylbenzene.

5. The process of claim 1 wherein said active groups are present in the $H^+$, $NH_4^+$, alkali metal, alkaline earth metal or manganese-form.

References Cited

UNITED STATES PATENTS

| 3,003,866 | 10/1961 | Mattano et al. | 423—139 X |
| 3,752,745 | 8/1973 | Kane et al. | 423—139 X |

FOREIGN PATENTS

| 1,931,426 | 3/1970 | Germany | 75—101 BE |

OTHER REFERENCES

Dzhaparidze et al. "Chemical Abstracts," vol. 62, 1965, p. 13884(h).

HERBERT T. CARTER, Primary Examiner

U.S. Cl. X.R.

423—139; 75—101 BE